United States Patent [19]

Hood et al.

[11] 4,417,414

[45] Nov. 29, 1983

[54] FISHING LINE RELEASE MECHANISM

[76] Inventors: Robert A. Hood, 23265 Lago Mar Cir., Boca Raton, Fla. 33432; Peter Lindgren, 4491 Crystal Lake Dr., Pompano Beach, Fla. 33064

[21] Appl. No.: 236,123

[22] Filed: Feb. 19, 1981

[51] Int. Cl.³ .............................................. A01K 91/06
[52] U.S. Cl. .................................................. 43/43.12
[58] Field of Search .................... 43/27.4, 43.1, 43.12, 43/44.92, 44.95

[56] References Cited

U.S. PATENT DOCUMENTS

| Re. 25,650 | 10/1964 | Strumpf | 43/43.12 |
| 3,919,801 | 11/1975 | Bart | 43/43.12 |
| 3,930,330 | 1/1976 | Black | 43/43.12 |
| 4,028,837 | 6/1977 | Clark | 43/43.12 |
| 4,221,068 | 9/1980 | Roemer | 43/43.12 |

Primary Examiner—Nicholas P. Godici
Assistant Examiner—Marc Hodak
Attorney, Agent, or Firm—Joseph Zallen

[57] ABSTRACT

Fishing line release mechanism for a downrigger or the like in which there are two claims for holding the fishing line and a cam. Each clip is separately tensioned, preferably adjustable. The clip engaging the upper fishing line segment is pivotally and eccentrically connected to the cam while the clip for the outward segment of the fishing line is fixedly connected to the center of the cam. The line is guided by grooves from the upper to the lower clip. Release of either clip causes the other clip to release, thus causing the entire fishing line to drop free from the mechanism.

6 Claims, 8 Drawing Figures

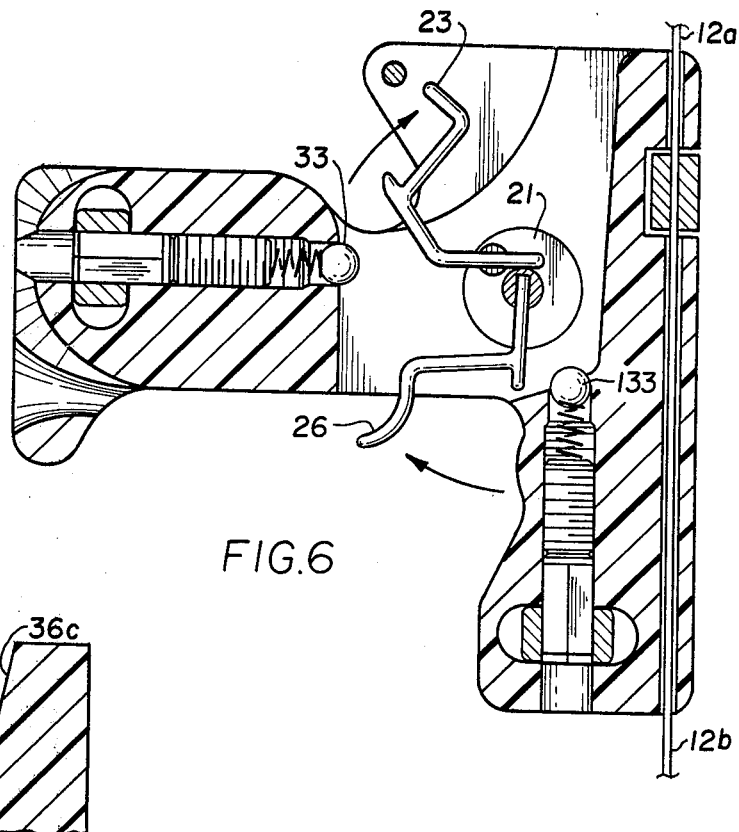
FIG.6
FIG.7
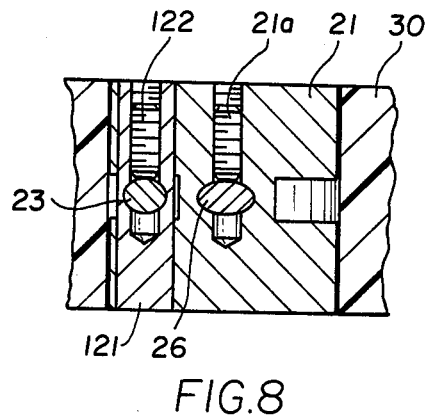
FIG.8

FISHING LINE RELEASE MECHANISM

BACKGROUND OF INVENTION

This invention relates to fishing line release mechanisms. In particular it relates to release mechanisms which hold the fishing line at some depth in the water on a control cable which is held down by a heavy weight. These arrangements are commonly referred to as downriggers.

Prior art release mechanisms for downriggers and the like are exemplified by the following U.S. Pat. Nos. Re. 25,650; 3,916,557; 3,930,330; 4,028,837 and 4,221,068. A common disadvantage to the prior art devices is that they do not isolate the desired release force attributable to a fish from the other forces on the mechanism which are attributable to line drag and vary with speed, depth and line size. Accordingly, premature release by these other forces is common. Another common problem is the great difficulty in making proper adjustment for the release tension. Still another disadvantage among the prior art devices is the requirement of special hardware attached to the fishing line after release. Yet another disadvantage among the prior art is the awkwardness and difficulty of retrieval of the fishing line.

One object of the present invention is to provide a fishing line release mechanism which avoids the disadvantages of the prior art.

Other objects and advantages of this invention will be apparent from the description and claims which follow taken together with the appended drawings.

SUMMARY OF INVENTION

The invention comprises generally a fishing line release mechanism for a downrigger or the like in which there are two clips for holding the fishing line and a cam. Each clip is separately tensioned, preferably adjustable. The clip engaging the upper fishing line segment is pivotally and eccentrically connected to the cam while the clip for the outward segment of the fishing line is fixedly connected to the center of the cam. The line is guided by grooves from the upper to the lower clip. Release of either clip causes the other clip to release, thus causing the entire fishing line to drop free from the mechanism.

BRIEF DESCRIPTION OF DRAWINGS

FIG. 6 is a similar view as in FIG. 5 except that the fishing line has now been disengaged.

FIG. 7 is a view along line 7—7 of FIG. 3.

FIG. 8 is a section along line 8—8 of FIG. 3.

SPECIFIC EXAMPLE OF INVENTION

Figure 1:
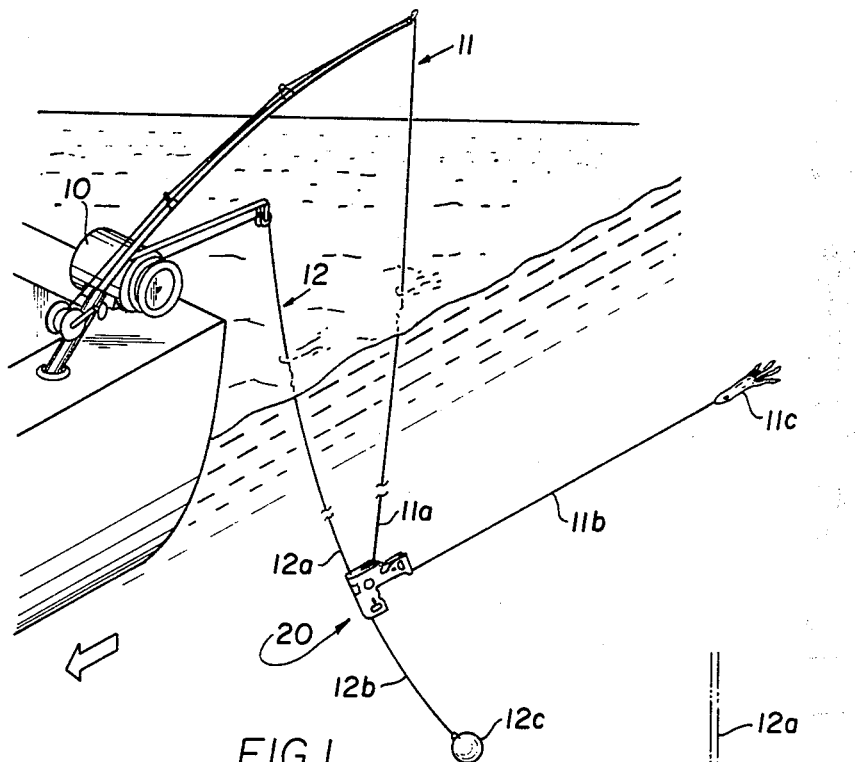
FIG. 1 is a perspective diagrammatic view showing an embodiment of the release mechanism of this invention in position in the water on the control or downrigger line.
Figure 2:
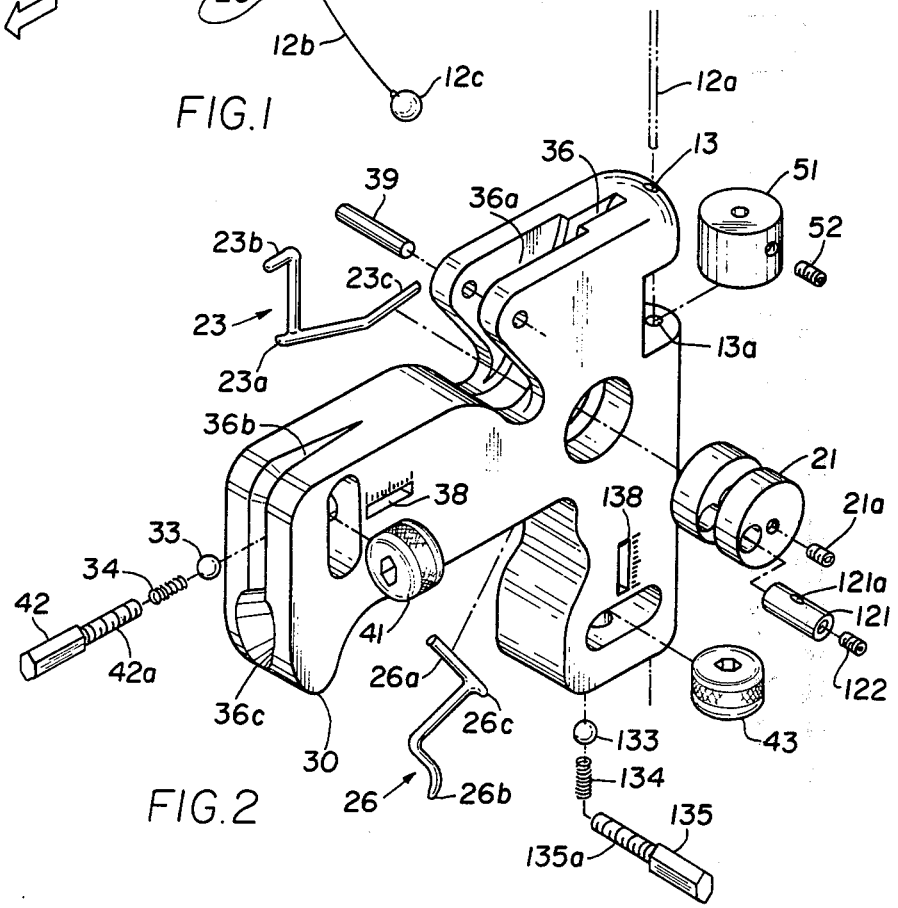
FIG. 2 is an exploded view of the embodiment.
Figures 3, 4:
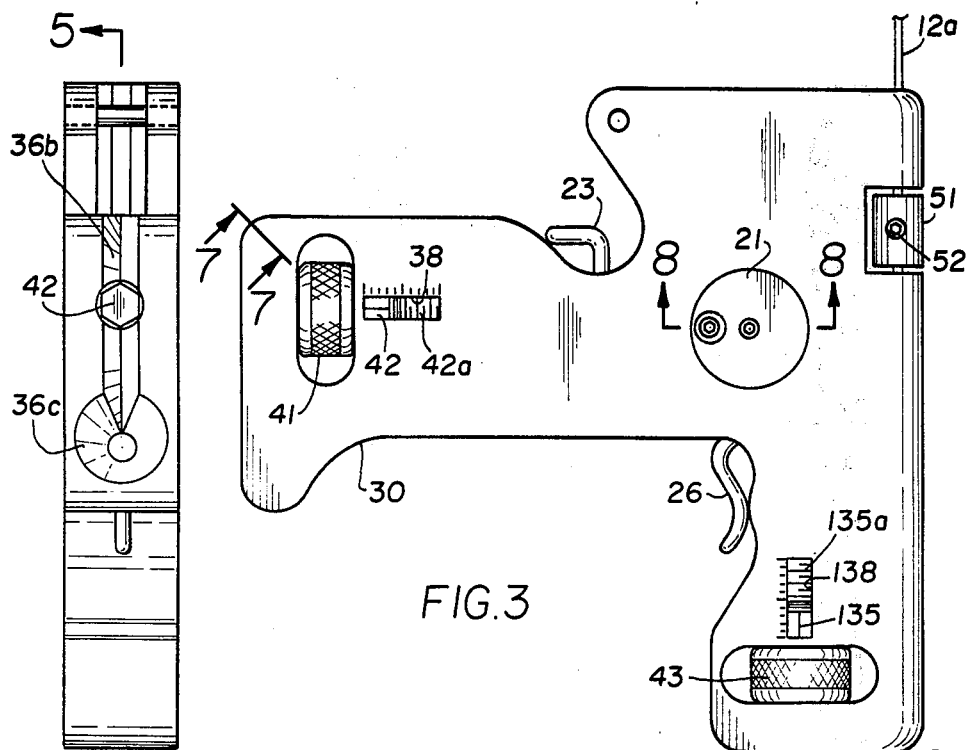
FIG. 3 is a side view.
FIG. 4 is a left end view.
Figure 5:
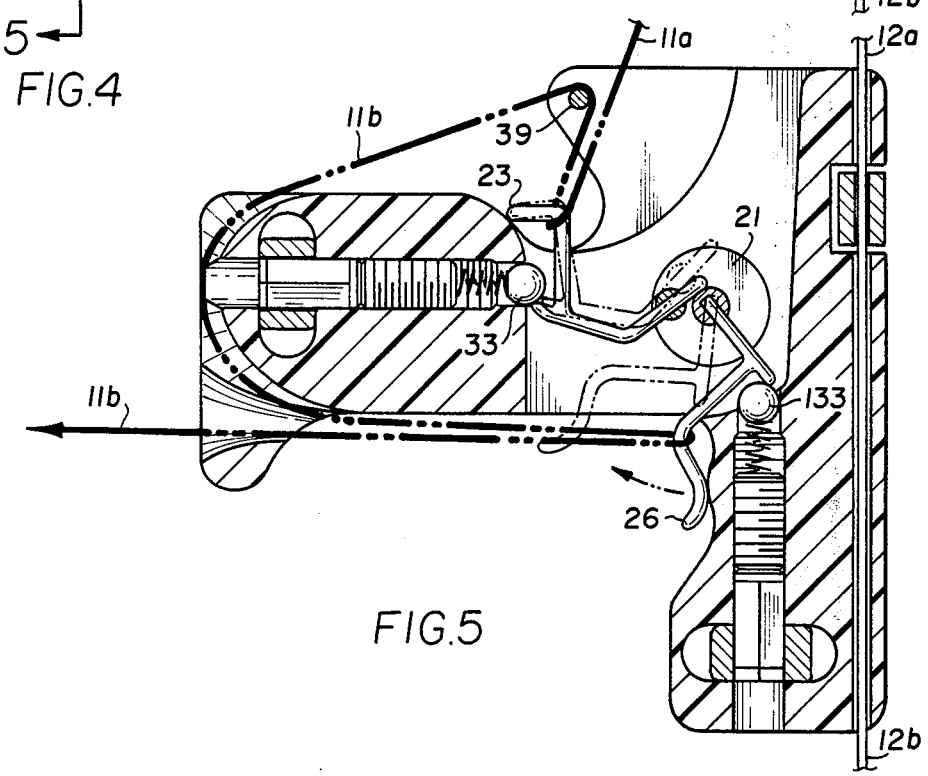
FIG. 5 is a section along 5—5 of FIG. 4 showing the fishing line engaged with the mechanism.

Referring now to the drawings, there is illustrated therein a boat with a downrigger 10 mounted on its stern. The downrigger assembly comprises generally a line 12 at the end of which is a weight 12c down deep in the water. Attached to line 12 is the release device 20 of this invention. The fishing line 11 goes through and is held by the device 20 and extends rearwardly terminating in bait 11c. The fishing line 11 will stay in the same position on the device until there is either a bite by a fish on the bait thus pulling segment 11b or an unusually severe force on the upper part of the fishing line 11a. In either case, the line will be released and fall free from the control device.

The device 20 is held on the downrigger or control line 12 by means of a cylinder 51 through which line 12 passes, the cylinder 51 being attached to the selected position on the downrigger line 12 by a set screw 52. The control line 12 preferably goes through orifices 13 and 13a in the main body 30 of the device. The device can thus be easily slid up and down line 12 to the desired location of attachment and rotates freely.

The main body 30 has an interior slot 36 and a wider slot 36a which permits the fishing line 11 to be properly threaded on to the upper clip 23. The front of the body has a V-shaped groove 36b terminating in an opening 36c which enables the line to be properly positioned and engage the lower clip 26.

The upper clip 23 has a hook portion 23b on which the upper line segment 11a is held, a detent 23a engaging ball 33 having an adjustable pressure brought about by a threaded member 42, in conjunction with a spring 34, and an arm 23c connected to a rod 121 through orifice 121a and threaded member 122. Rod 121 is rotatably mounted in an eccentric position in cam 21 so that clip 23 is effectively pivotally mounted on cam 21.

When the tension on line segment 11a exceeds the predetermined pressure on ball 33 and the predetermined pressure on ball 133 the detents 23a and 26c are disengaged causing clockwise rotation of cam 21 and dropping off of the fishing line 11a from clip 23.

The lower clip 26 likewise has a detent 26c engagable with the ball 133 whose pressure is adjusted by threaded member 135, in conjunction with spring 134. A hook end 26b is used for engagement of the line 11 after it passes around the end of the body 30. An arm 26a is fixedly connected to fixed member 21a in the central portion of cam 21 so that it moves with cam 21. Thus, if there is sufficient pull on the bait 11a by a fish so as to overcome the tension on ball 133, it dislodges detent 26b resulting in clockwise movement of the cam 21 and causing fishing line segment 11b to drop off from clip 26.

Rotation of the cam 21 by excess tension on line segment 11a causes disengagement of clip 26. Rotation of the cam 21 by excess tension on line segment 11b causes disengagement of clip 23. It is clear that disengagement of one clip automatically causes disengagement of the other clip. The adjustments on the ball tension are regulated to reflect the desired conditions. Thus, a relatively low force can disengage the lower clip by a pull on the line segment 11b while the upper clip ball 33 is arranged to have a significantly high force required on the upper segment of the fishing line 11a before it is disengaged.

An adjustment knob 41 and an indicator window 38 are provided for the adjustment of ball 33 for the upper clip, while a similar adjusting knob 43 and indicator window 138 are provided for the adjustment of the lower clip 26.

In loading the fishing line, 11 it is recommended that a loop of 11a be threaded on arm 23b of clip 23. Clip 26 is held while the loop 11b is brought around the body onto arm 26b of clip 26. The entire unit is then positioned on control line 12 so that the lower segment 12b is several feet above weight 12c. The length of control line segment 12a varies with the body of water and the fish sought e.g. 10 feet to 150 feet or thereabouts.

We claim:

1. A fishing line release mechanism comprising support means, first clip means, first tensioning means, second clip means, second tensioning means and connection means; said first clip means being held by said first tensioning means so as to engage a first fishing line segment; said second clip means being held by said second tensioning means so as to engage a second fishing line segment; said clip means and said connection means being so connected that disengagement of either said clip means from its said line segment results in disengagement of said other clip means from its said line segment so that said entire fishing line is free of said mechanism.

2. The mechanism of claim 1 wherein said connection means is pivotally and eccentrically connected to said first clip means and centrally and fixedly connected to second clip means.

3. The mechanism of claim 1 wherein each said tension means is independently adjustable.

4. The mechanism of claim 1 wherein said support means has grooves for guiding the fishing line into said clip means and for gripping the fishing line in order to minimize slippage.

5. The mechanism of claim 1 wherein the support means has two arms, and a cylinder between the arms; said control line passing through said arms and cylinder; a cylinder being attachable to said control line.

6. The mechanism of claim 3 wherein a said tension means comprises adjustable spring and ball means.

* * * * *